Figure 1:
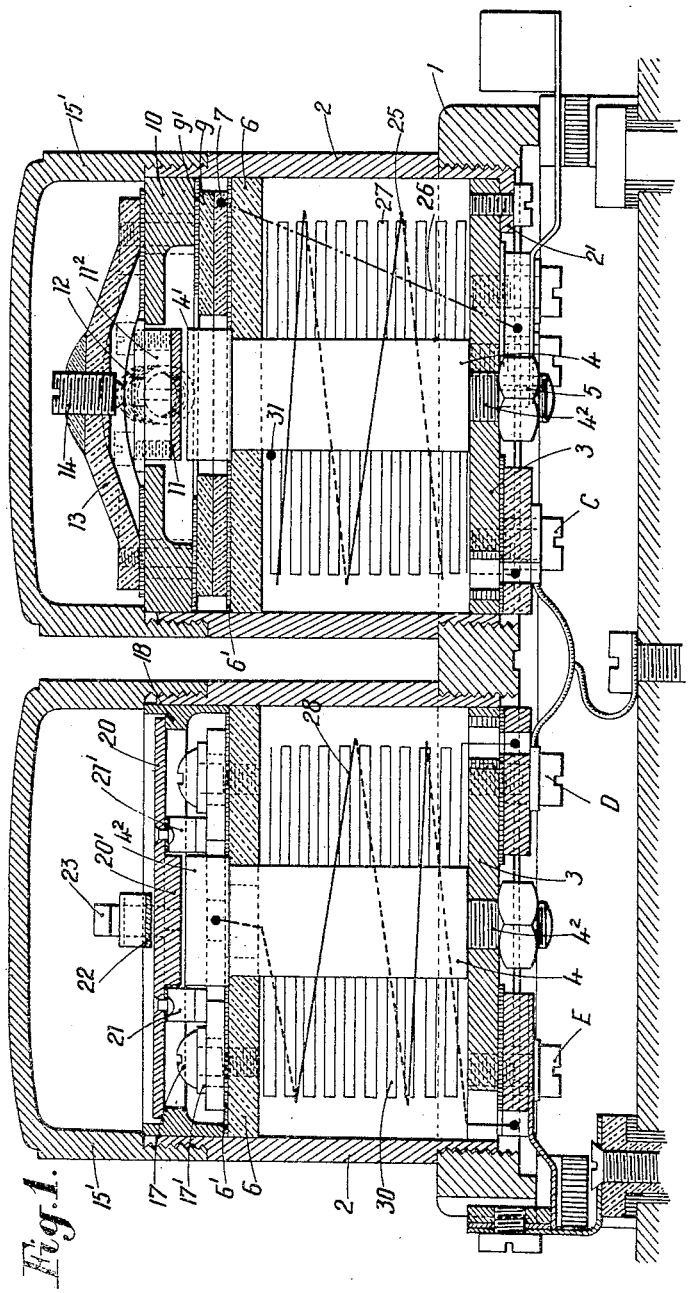

E. FUCHS.
APPARATUS FOR CONTROLLING THE VOLTAGE IN VARIABLE SPEED ILLUMINATING DYNAMOS.
APPLICATION FILED JAN. 16, 1915.

1,204,857.

Patented Nov. 14, 1916.
4 SHEETS—SHEET 1.

Witnesses.
Inventor.

E. FUCHS.
APPARATUS FOR CONTROLLING THE VOLTAGE IN VARIABLE SPEED ILLUMINATING DYNAMOS.
APPLICATION FILED JAN. 16, 1915.
1,204,857.
Patented Nov. 14, 1916.
4 SHEETS—SHEET 2.
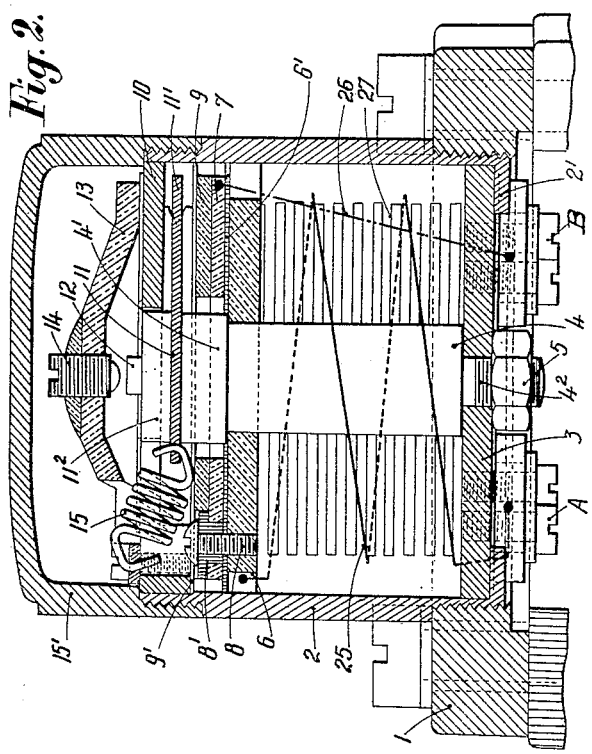

E. FUCHS.
APPARATUS FOR CONTROLLING THE VOLTAGE IN VARIABLE SPEED ILLUMINATING DYNAMOS.
APPLICATION FILED JAN. 16, 1915.

1,204,857.

Patented Nov. 14, 1916.
4 SHEETS—SHEET 3.

UNITED STATES PATENT OFFICE.

ERNEST FUCHS, OF BILLANCOURT, FRANCE, ASSIGNOR TO LOUIS RENAULT, OF BILLANCOURT, FRANCE.

APPARATUS FOR CONTROLLING THE VOLTAGE IN VARIABLE-SPEED ILLUMINATING-DYNAMOS.

1,204,857.  Specification of Letters Patent.  Patented Nov. 14, 1916.

Application filed January 16, 1915. Serial No. 2,752.

*To all whom it may concern:*

Be it known that I, ERNEST FUCHS, citizen of the French Republic, residing at Billancourt, Department of the Seine, in France, have invented certain new and useful Improvements in Apparatus for Controlling the Voltage in Variable-Sped Illuminating-Dynamos; and I do hereby declare the following to be a full, clear, and exact description of the invention, such as will enable others skilled in the art to which it appertains to make and use the same.

This invention relates to improvement in apparatus for controlling the voltage at the terminals of generators used particularly for the illumination of automobile vehicles or for charging storage batteries. Apparatus of this kind usually comprises two devices combined in a single apparatus, which is situated in the vicinity of the dynamo and which constitutes, in some measure, a single device performing two distinct functions, viz., the circuit making and breaking device intended to interrupt the charging current when the voltage drops below a predetermined value, and the controller which produces the interruption of the field current when, with the increasing speed of the generator, the voltage of the latter tends to assume a value which is too great and liable to damage the apparatus included in the external circuit. Each of these controllers comprises an electromagnet acting on a small armature of soft iron producing, by its vibrations, either a modification in the self-induction of the primary circuit and therefore in the effective value of the intensity of the field current, or the interruption of the circuit including the storage batteries in order to avoid the latter discharging into the generator owing to the low voltage of the same. The electromagnets which constitute the most important part of these apparatuses have the common defect that they possess a relatively small strength of attraction, owing to the magnetic leakages of the core. It follows therefrom that the controlling spring mounted on the small steel armature must not be too powerful; this spring is therefore inadequate when the apparatus is provided on a vehicle, to oppose the detachment of the armature caused by the vibrations and the external shocks.

One object of the present invention is to eliminate this drawback and this I accomplish by providing a continuous soft iron casing inclosing completely the solenoid on the attractable armature and preventing all magnetic leakages. This permits of making the controlling spring much stronger and of preserving the equilibrium of the blade whatever the vibrations of the vehicle may be.

Another object is to provide apparatus which allows the armatures to be readily removed and exchanged in case of mishap.

The accompanying drawing shows by way of an example one constructional form of a device built according to the invention.

Figure 4:
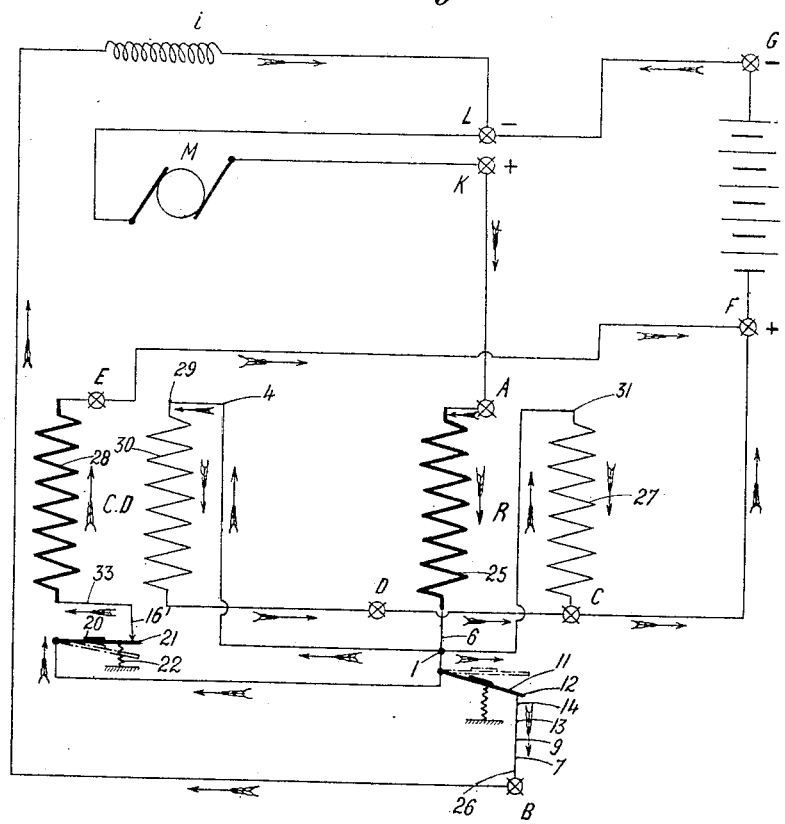

Figure 1 is a vertical section through the controller and the circuit making and breaking device constructed in accordance with the invention. Fig. 2 is a vertical section through the controller taken on a plane at right angles to that of Fig. 1. Fig. 3 is a vertical section through the circuit making and breaking device also taken on a plane at right angles to that of Fig. 1. Fig. 4 shows diagrammatically the arrangement of the circuits.

The controller and the circuit making and breaking device are mounted on a rectangular base 1 which is common to both, and is formed with two tapped holes adapted to receive the soft iron cylinders 2, 2 of the controller and the said device; these cylinders 2, 2 entirely surrounding the coils 27 and 30.

On the right of Fig. 1, the cylinder constituting the frame of the controller, is provided at its lower part, with a flange 2′ divided into three segments leaving between them three empty spaces in which are disposed the three current terminals connected to the windings of the apparatus. Upon these flanges, a circular plate 3 is fixed by means of a screw, said plate being formed in its center with a tapped hole. In this hole there is screwed and maintained in contact with the said plate 3 by means of a nut 5, the extension $4^2$ of a soft iron core 4 which is provided, at its other end, with a head 4′. The core 4 is provided with two windings one of thick wire and the other of thin wire, these windings being located between the plate 3 and the upper copper plate 6 which is threaded onto the core 4, the head 4' of which serves as an abutment. Upon this plate 6, a thin sheet of mica 6' is placed separating the same from another copper plate 7 secured thereupon by means of three screws 8 arranged at 120° from one another, and traversing the sleeves 8' electrically insulating the two plates. Over the whole arrangement which has just been described, the copper rim 9 is fixed on the flange of an annular member 10 from which it is separated by a mica ring 9'. This member 10 is provided with a notch in which the end 11' of the soft iron armature 11 is secured, the other end of which is surmounted by a small soft iron cylinder 11² provided with a platinum covered tip 12 and moving in a recess formed in the upper part of the member 10. The whole is covered by a cap connected electrically with the copper rim 9 by means of a screw traversing the member 10 through the medium of insulating sleeves. This cap is provided at its upper part with a screw 14 adapted to be struck by the tip 12 and which serves to control the amplitude of the vibrations of the armature 11. The latter is maintained at a distance from the core 4' by means of a spring 15 fixed, on the one hand by one of its ends to the armature 11, and on the other, to a small member secured to the ring 10. An aluminum cap 15' screwed on the cylinder 2 protects the interior of the controller.

The circuit making and breaking device comprises like the controller, a frame 2 provided with a lower flange divided into two segments separated by two spaces in which the current terminals are disposed. Upon these flanges, a base plate 3 is screwed, supporting the core 4 which latter is provided with a thick wire winding and a thin wire winding. A copper washer 6 is clamped between the head 4' of the core and the upper part of the windings. Upon the mica plate 6' located on the washer 6, two copper half-rings 16 and 16' are placed, separated from each other and maintained on the member 6 by the screws 17 which are located in the insulating sleeves 17'. Upon this whole, a movable structure is located, comprising a small cylinder 18 to which, at the point 19, the soft iron cover 20 is hingedly connected, which cover is formed with the boss 20' serving as an armature for the electromagnet. On either side of the boss 20', the contacts 21 and 21' are disposed, one end of which is always in contact with the rim 16 while the other comes into contact with the rim 16' only when the armature 20' is attracted by the core 4'.

The displacements of the member 20 around the hinge 19 are limited by a rod 22 forming a spring. This rod is fixed by one of its ends having the shape of a fork on either side of the hinge. Its other end moves within a notch 23' formed in the member 23 which is soldered to the cylinder 18. Finally the whole is covered by an aluminum cap 15' screwed on the exterior of the frame. The operation of these apparatus is as follows:

*1. Controller.*—The thick wire winding 25 of the controller is in series with the primary circuit. Current is supplied to the terminal A and traverses the winding 25 which ends at the plate 6 and therefore at the frame 1. Through the soft iron armature 11, the platinum covered tip 12 and the screw 14, the current reaches the cap 13 whence it passes to the plate 9 which is in contact with the plate 7 which plate communicates with the terminal B through the medium of the conductor 26. From the terminal B, the current traverses the field windings of the generator and returns to the other brush L. In order to increase the power of the electromagnet, the thin wire winding 27 is traversed by the charging current. One of the terminals of the thin wire winding is at 31 on the frame of the apparatus, while the other terminal C is connected to the positive terminal of the battery. There circulates therefore in the winding 27 a current leading from the brush K, through the terminal A, the frame 1, the winding 27, the terminal C, the positive pole of the battery F, the battery, the negative pole G and the brush L. When the speed of the generator increases, the current in the primary and charging circuits increases, causing for a predetermined value, the magnetic attraction of the armature 11. The field circuit is then interrupted by the separation of the tip 12 and the screw 14. This results in voltage drop which produces the release of the armature. These same phenomena are subsequently periodically reproduced and the vibrations of the armature which are a consequence thereof, insure according to their frequency, a perfect control of the voltage.

*2. Circuit making and breaking device.*— The primary current is brought to the apparatus as has been stated above from the brush K, through the terminal A and the winding 25. Thence it reaches through the frame 1 the end 29 of the thin wire winding 30 which is connected with the core 4 of the said device whence it passes to the terminal D which is electrically connected to the positive pole of the battery. When the current is sufficiently strong to permit of charging the battery, the spring 22 of the armature 20 (having a suitable strength) permits the armature to be attracted and the contacting of the blades 21 with the half-ring 16'. A current is thus established, leading from the brush K, passing through the terminal A, the thick winding 25, the plate 6, the frame 1, the blade 21, the semiring 16', the conductor 33, the thick winding 28 and the terminal E, to the terminal F and leading through the battery from the terminal F to the terminal G and to the other brush L of the dynamo. When the armature is attracted, the contact between the rim 16' and the blades 21 closes this latter circuit. If for any reason whatsoever, the voltage of the generator should drop, the armature is released and the charging circuit is interrupted. The battery of accumulators thus cannot discharge on to the generator.

The apparatus hereinbefore described is naturally mounted in an insulated manner on the chassis of the vehicle or the frame of the generator. As will be apparent the upper covers in which are mounted the armatures and their supports are closed by a member distinct from that which constitutes the core proper so that it can be readily replaced in case of a mishap. Thus the member 10 of the controller and member 18 of the cut out may be readily removed and exchanged when necessary.

What I claim is:—

1. In apparatus of the kind described, the combination with a coil and a central magnetic core, of a magnetic element, spaced magnetic plates connecting the core to said element, one of said plates having an opening therein, and means including an armature for breaking the circuit through the device, which armature is located within said opening.

2. In apparatus of the kind described, the combination with a coil and a central magnetic core, of a magnetic element, spaced magnetic plates connecting the core to said element, one of said plates having an opening therein, and detachable means including an armature for breaking the circuit through the device, which armature is located within said opening.

3. In apparatus of the kind described, a combination with a coil and a central magnetic core, of a magnetic element, spaced magnetic plates connecting said core to said element, means including an armature for breaking the circuit through said device, and an aluminum cap for said magnetic element.

4. In apparatus of the kind described, a combination with a coil and a central magnetic core, of a magnetic element, spaced magnetic plates connecting said core to said element, means including an armature for breaking the circuit through said device, and an aluminum cap for said magnetic element, one of said plates being held in position by said cap.

5. In an apparatus of the class described adapted to be included in a battery charging circuit, a magnetic core, a pair of spaced terminals, an armature for said core, means carried by the armature for bridging between said terminals, and means for releasing said bridging means from one of the terminals when the voltage between the terminals drops to a predetermined point.

6. In an apparatus of the class described adapted to be included in a normally open charging circuit, a pair of spaced terminals, means active under the influence of a current of predetermined intensity to bridge said terminals, and means for releasing said closing means when the voltage between the terminals drops to a predetermined point.

In testimony whereof I affix my signature in presence of two witnesses.

ERNEST FUCHS.

Witnesses:
 DE WITT C. POOLE, Jr.,
 HENRI COHEN.